United States Patent [19]

Moote

[11] 4,237,523

[45] Dec. 2, 1980

[54] REMOVABLE FOG LIGHT FILTERS

[76] Inventor: Bruce Moote, 11 Madison Ave., Hamilton, Ontario, Canada, L8L 5Y2

[21] Appl. No.: 32,606

[22] Filed: Apr. 23, 1979

Related U.S. Application Data

[63] Continuation of Ser. No. 818,740, Jul. 25, 1977, abandoned.

[51] Int. Cl.[3] .......... F21V 9/02; B60Q 1/00

[52] U.S. Cl. .......... 362/2; 362/61; 362/293; 362/452

[58] Field of Search .......... 362/2, 255, 256, 293, 362/319, 355, 452, 443, 440, 439, 61, 83

[56] References Cited

U.S. PATENT DOCUMENTS

| | | | |
|---|---|---|---|
| 1,384,578 | 7/1921 | Tomlinson | 362/443 |
| 2,499,555 | 3/1950 | Wronkowski | 362/293 |
| 2,668,903 | 2/1954 | Barcus | 362/293 |
| 2,734,129 | 2/1956 | Kahla | 362/293 |
| 2,807,711 | 9/1957 | McDonald | 362/293 |
| 3,696,238 | 10/1972 | Szymanski | 362/293 |
| 4,006,377 | 2/1977 | Kosmatka | 362/293 |

*Primary Examiner*—Donald P. Walsh
*Attorney, Agent, or Firm*—Robert D. Farkas

[57] ABSTRACT

A removable fog light filter for automobile headlights or the like includes a retaining member adapted to be affixed to the rear of the headlight and having radially and forwardly extending arms provided with apertures at their distal ends adapted to removably receive protrusions provided proximate the circumference of a transluscent light filter for retaining the filter against the headlight front lens portion.

5 Claims, 4 Drawing Figures

REMOVABLE FOG LIGHT FILTERS

This application is a Continuation of prior U.S. Application Ser. No. 818,740, filed on July 25, 1977, now abandoned.

BACKGROUND OF THE INVENTION

1. Field of the Invention

The present invention relates to fog lights for automobile and the like, and more particularly, to a removable fog light filter which may be utilized with conventional headlights.

2. Description of the Prior Art

The ineffectiveness of conventional automobile headlights in fog is well known. The white light provided by these lights are reflected and scattered in all directions, generally failing to illuminate the roadway ahead, and often generating glare or reflections distressing to the operator of the vehicle. Thus, later model vehicles were provided with an extra set of lights specifically designed to penetrate the fog and illuminate the roadway with minimum reflections. However, these amber colored fog lights generally become dirty since they are exposed all the time, and when needed most do not provide sufficient light output.

Many attempts have been made to utilize the main headlight beam, which has a greater light output, to perform the function of a fog light by adding an attachment or fixture thereto. Examples of such devices may be found in U.S. Pat. No. 3,191,025 issued to J. K. Harker on June 22, 1965 which discloses a convex spherical lens having resilient straps peripherally extending therefrom for snapping over a headlight rim. However, the shock and vibration normally associated with an automobile may easily dislodge such an apparatus. U.S. Pat. No. 3,334,220 issued to P. T. Komiske on Aug. 1, 1967 discloses a similar device which utilizes a magnetic assembly to hold the lens to the headlight. This type of apparatus is expensive to manufacture and requires cooperating metal for the magnets to adhere, to be effective. U.S. Pat. No. 2,544,378 issued to C. A. Cyr on Mar. 6, 1951 and U.S. Pat. No. 2,530,685 issued to C. E. Davis et al on Nov. 21, 1950 utilize suction cups to hold the lens to the headlight. Suction cups, as is well known, do not have the staying power over relatively long periods of time. An early U.S. Pat. No. 1,129,106 issued to C. Lightfoot on Feb. 23, 1915 utilized a spring and chain mechanism to hold the lens on the headlight and required the headlight to be provided with a circumferential lip or frame member.

The present invention overcomes the shortcomings of the prior art by providing an inexpensive light filter which may be readily installed and removed while being securely maintained in position when in use.

SUMMARY OF THE INVENTION

Accordingly, it is therefore an object of this invention to provide a transluscent light filter to fit all automobile headlights presently in use and one which may easily be removed and installed according to driving conditions.

A further object of the present invention is to provide a transluscent light filter which may readily conform to the surface irregularities usually associated with the lens portion of a headlight.

A still further object of the present invention is to provide a transluscent light filter which is not restricted to a particular configuration of the headlight itself.

Still another object of the present invention is to provide a transluscent light filter which may be utilized in conjunction with headlights used on old as well as late model automobiles.

Another object of the present invention is to provide an inexpensive, easily installable transluscent light filter.

These objects, as well as, further objects and advantages of the present invention will become readily apparent after reading the description of a non-limiting illustrative embodiment and the accompanying drawing.

A removable fog light filter for automobile headlights or the like, having a front lens portion and a rear neck portion, according to the principles of the present invention, comprises in combination, a retaining member including a C-shaped yoke portion for partially circumscribing rear neck portion of an automobile headlight, at least three substantially equally spaced radially extending arms emanating from the yoke portion and extending in a forwardly direction towards and beyond the front lens portion of the headlight, each of the radially extending arms being provided with an aperture and curved in an inwardly direction towards the center of the lens portion at its distal end; and a transluscent light filter being of a size and shaped to substantially cover the lens portion of the automobile headlight and having at least three protrusions equally disposed proximate the circumference thereof, adapted to be received by the radial arm apertures and being removably retained thereon for retaining the filter against the headlight front lens portion; the light filter filtering the light provided by the headlight and converting it to a fog penetrating beam.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
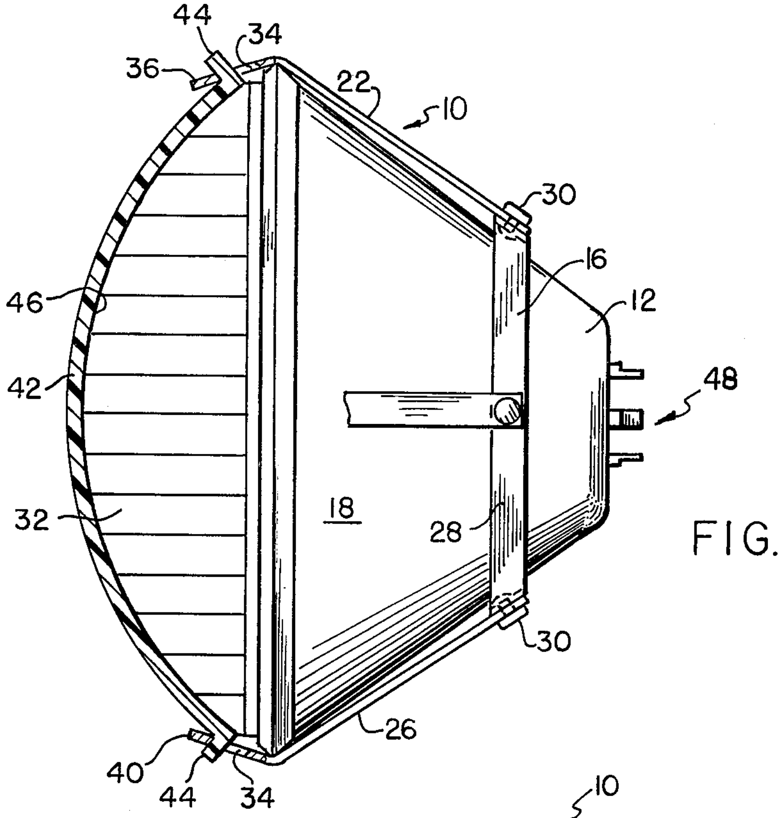
FIG. 1 is a side elevational view, partially in section, of a light filter affixed to a headlight, according to the principles of the present invention.
Figure 3:
FIG. 3 is an enlarged partial view of the front portion of the light filter engaged by a radial arm.
Figure 2:
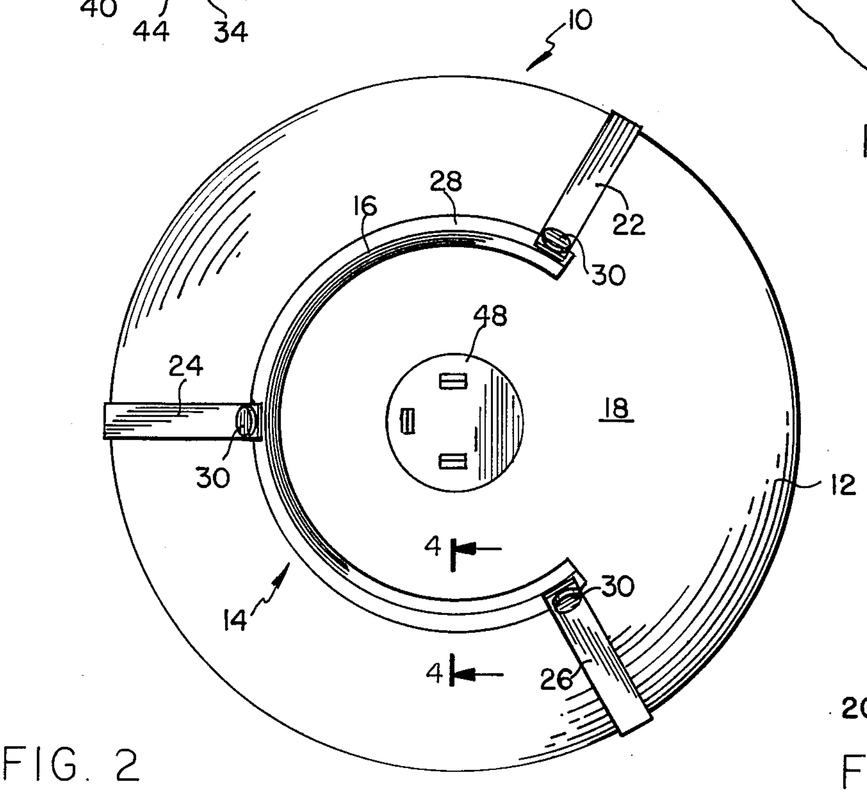
FIG. 2 is a rear view in elevation of a headlight showing the retaining member disposed on the rear of the headlight.
Figure 4:
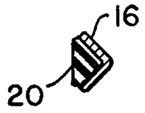
FIG. 4 is a V-shaped cross-section of the C-shaped yoke.

Referring to the figures, and more particularly to FIGS. 1 and 2, there is illustrated therein a removable fog light filter 10 affixed upon an automobile headlight 12. The filter 10 includes a retaining member 14 which has a C-shaped yoke portion 16 for partially circumscribing the rear neck portion 18 of the headlight 12. It is contemplated that the yoke portion 16 be fabricated of spring steel in order to retain its position once installed about the neck of the headlight 12 and may be V-shaped in cross-section for strength (see FIG. 4). In addition, a shock absorbing material 20 which may be a felt or rubber material, may be used to fill the open portion of the V, thereby, preventing damage to the headlight 12.

Radial arms 22, 24 and 26 are affixed to one surface 28 of the yoke 16, such as by welding rivets 30. The radially extending arms 22, 24 and 26 are preferably equally spaced (120°) therebetween and extend in a forwardly direction towards and beyond the front lens portion 32 of the headlight 12. Each of the radially extending arms 22, 24 and 26 is provided with an aperture 34 at their distal ends 36, 38 and 40, respectively, which is curved inwardly towards the center of the lens portion 32 of the headlight 12.

It is also contemplated that the radially extending arms 22, 24 and 26 be fabricated of spring steel, however, a suitable plastic material may be used for both the yoke portion 16 and the radially extending arms 22, 24 and 26, thus permitting a unitary structure for the retaining member. Although only three radially extending arms 22, 24 and 26 are illustrated in the drawings, it is within the scope and intent of this invention to include any number thereof required to sufficiently retain a light filter 42 to the headlight 12.

The transluscent light filter 42 is preferably made of a suitable plastic material, but unbreakable glass may also be utilized. The filter 42 is provided with protrusions 44 equally disposed proximate the circumference thereof and adapted to cooperate with and be received by the apertures 34 provided in the distal ends 36, 38 and 40 of the radially extending arms 22, 24 and 26. The concave inner portion 46 of the filter is generally shaped to the outer surface of the lens portion 32 of headlight 12 and will not interfere with any protrusions generally found there.

In operation, the retaining member 44 is slid around the rear neck portion 18 of headlight 12 once it is released and slid forward out of its mounting. The radial arms 22, 24 and 26 are permitted to extend forwardly surrounding the headlight 12 as it is returned into its mounting. The headlight energizing wires and plug, not shown, are connected to the terminals 48 of headlight 12 in a conventional manner and there is no interference with the retaining member 14. The filter 14 is placed over the surface of the lens portion 32 and the apertures 34 of each radial arm 22, 24 and 26 is pressed over the protrusions 44 on the filter 42, thus retaining it in position.

To remove filter 42, each radial arm 22, 24 and 26 is urged in a upwardly and outwardly direction releasing the apertures 34 from the protrusions 44, thus freeing the filter 42.

Therefore, a primary advantage of the present invention is to provide a transluscent light filter to fit all automobile headlights presently in use and one which may easily be removed and installed according to driving conditions.

A further advantage of the present invention is to provide a transluscent light filter which may readily conform to the surface irregularities usually associated with the lens portion of a headlight.

A still further advantage of the present invention is to provide transluscent light filter which is not restricted to a particular configuration of the headlight itself.

Still another advantage of the present invention is to provide a transluscent light filter which may be utilized in conjunction with headlights used on old as well as late model automobiles.

Another advantage of the present invention is to provide an inexpensive, easily installable transluscent light filter.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention what is claimed is:

1. A removable fog light filter for automobile headlights or the like, having a front lens portion and a rear neck portion and terminals, wherein said neck portion has a truncated conical shape and wherein said terminals are disposed at the apex of said conical shape, comprising in combination: a retaining member including a C-shaped yoke portion, said yoke portion having an open mouth portion between the ends of said C-shaped yoke portion, said yoke portion configured for only partially circumscribing a portion of said truncated conical shape of said rear neck portion of said automobile headlight, said yoke portion being a V-shaped rigid member disposed having the apex of said V-shaped member extending substantially parallel to a conically shaped surface of said truncated conical shape of said rear neck portion of said automobile headlight when said C-shaped yoke portion is positioned intermediate said front lens portion and said apex of said conical shape, a resilient member, said resilient member being disposed intermediate and clampingly engaging said conically shaped surface and said V-shaped member when said C-shaped yoke portion is positioned intermediate said front lens and said apex of said conical shape, at least three substantially equally spaced radially extending arms emanating from said yoke portion and extending in a forwardly direction towards and beyond the front lens portion of said headlight when said yoke portion is disposed touching said portion of said rear neck portion, each said redially extending arm being provided with an aperture and curved in an inwardly direction towards the center of said lens portion at its distal ends; and a transluscent light filter being of a size and shaped to substantially cover the lens portion of said automobile headlight and having at least three protrusions equally disposed proximate the circumference thereof adapted to be received by said radial arm aperture and being removably retained thereon for retaining said filter against said headlight front lens portion, wherein said filter and said resilient member engage said headlight in clamping engagement when said at least three protrusions are engaged within said radial arm aperture and wherein said yoke portion may be disposed disengaged from said headlight when said at least three protrusions are disengaged from said radial arm aperture by displacing the remaining portion of said headlight through said open mouth portion, said light filter filtering said light provided by said headlight and converting it to a fog penetrating beam.

2. A removable fog light filter according to claim 1 wherein said retaining member is a unitary structure.

3. A removable fog light filter according to claim 1 wherein said transluscent light filter is amber in color.

4. A removable fog light filter according to claim 1 wherein said retaining member is made of metal and said radial arms are welded to said yoke portion.

5. A removable fog light filter according to claim 1 wherein said retaining member is a unitary member fabricated from a plastic material.

* * * * *